US009100437B2

(12) United States Patent
Huba et al.

(10) Patent No.: US 9,100,437 B2
(45) Date of Patent: Aug. 4, 2015

(54) METHODS, APPARATUS, AND ARTICLES OF MANUFACTURE TO PROVIDE FIREWALLS FOR PROCESS CONTROL SYSTEMS

(71) Applicant: FISHER-ROSEMOUNT SYSTEMS, INC., a Delaware Corporation, Austin, TX (US)

(72) Inventors: Robert Kent Huba, Georgetown, TX (US); Duncan Schleiss, Austin, TX (US); Gary Keith Law, Georgetown, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 41 days.

(21) Appl. No.: 13/628,964

(22) Filed: Sep. 27, 2012

(65) Prior Publication Data

US 2013/0081130 A1    Mar. 28, 2013

Related U.S. Application Data

(60) Provisional application No. 61/540,219, filed on Sep. 28, 2011.

(51) Int. Cl.
*G06F 9/00* (2006.01)
*H04L 29/08* (2006.01)
*H04L 29/06* (2006.01)

(52) U.S. Cl.
CPC .......... *H04L 67/16* (2013.01); *H04L 63/0236* (2013.01); *H04L 67/125* (2013.01)

(58) Field of Classification Search
CPC ......... H04L 29/06; H04L 63/08; H04L 47/10; H04L 63/101; G06F 9/4336
See application file for complete search history.

(56) References Cited

U.S. PATENT DOCUMENTS

| 5,828,833 | A | 10/1998 | Belville et al. |
| 5,944,823 | A | 8/1999 | Jade et al. |
| 6,754,831 | B2 | 6/2004 | Brownell |
| 8,621,552 | B1* | 12/2013 | Lotem et al. ...................... 726/1 |
| 2002/0004847 | A1* | 1/2002 | Tanno ........................... 709/249 |

(Continued)

FOREIGN PATENT DOCUMENTS

EP    1545086    6/2005

OTHER PUBLICATIONS

McAfee, "McAfee Host Intrusion Prevention 8.0, Product Guide for use with ePolicy Orchestrator 4.5", 2010, (154 pages).

(Continued)

*Primary Examiner* — Joseph P Hirl
*Assistant Examiner* — Leynna Truvan
(74) *Attorney, Agent, or Firm* — Hanley, Flight & Zimmerman, LLC

(57) ABSTRACT

Methods, apparatus, and articles of manufacture to provide firewalls for process control systems are disclosed. An example method includes analyzing a network communication to identify a first service, an address associated with the first service within a secured portion of a network, and a subset of ports used by the first service, the network communication originating from within the secured portion of the network and to be transmitted to a destination outside of the secured portion of the network, and storing an identifier of the first service, the address, and the subset of the ports when the network communication includes the identifier, the address, and the subset of the ports.

18 Claims, 9 Drawing Sheets

(56) References Cited

U.S. PATENT DOCUMENTS

2006/0053491 A1  3/2006  Khuti et al.
2007/0276950 A1  11/2007  Dadhia
2009/0106277 A1*  4/2009  Sidman .................. 707/100
2009/0254985 A1*  10/2009  Weller et al. ............ 726/11
2010/0275031 A1  10/2010  Ferry

OTHER PUBLICATIONS

Intellectual Property Office, "Combined Search and Examination Report under Sections 17 & 18(3)", issued in connection with patent application No. GB1217300.1, mailed Jan. 29, 2013 (2 pages).

* cited by examiner

METHODS, APPARATUS, AND ARTICLES OF MANUFACTURE TO PROVIDE FIREWALLS FOR PROCESS CONTROL SYSTEMS

RELATED APPLICATION

This patent claims priority to U.S. Provisional Patent Application No. 61/540,219, filed on Sep. 28, 2011, the entirety of which is hereby incorporated by reference.

FIELD OF THE DISCLOSURE

The present disclosure relates generally to process control systems and, more particularly, to methods, apparatus, and articles of manufacture to provide firewalls for process control systems.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies using the field devices via the buses and/or other communication links communicatively coupling the field devices.

Process information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may include a graphical user interface that displays the process control information including values of process variables, values of quality parameters associated with the process, process fault detection information, and/or process status information.

SUMMARY

Methods, apparatus, and articles of manufacture to provide firewalls for process control systems are disclosed. Example methods include analyzing a network communication to identify a first service, an address associated with the first service within a secured portion of a network, and a subset of ports used by the first service, the network communication originating from within the secured portion of the network and to be transmitted to a destination outside of the secured portion of the network, and storing an identifier of the first service, the address, and the subset of the ports when the network communication includes the identifier, the address, and the subset of the ports.

Some example methods further include comparing a second network communication, received from outside of the secured portion of the network, to the identifier of the first service, the address, and the subset of the ports. Some such example methods include forwarding the second network communication to an address and a port specified by the second network communication when the second network communication matches the identifier of the first service, the address, and a port in the subset of the ports.

Some example methods further include forwarding the second network communication to an address and a port specified by the second network communication when the second network communication matches the address and a port in the subset of the ports and does not match the identifier, based on at least one of a threshold time for the first network communication or a ping flag. Some such example methods further include setting the ping flag based on the first network communication.

Some example methods further include discarding the second network communication when the second network communication does not match a stored address and a stored port corresponding to the first service. Some examples include removing the identifier of the first service, the address, and the subset of the ports from a storage based on a threshold time.

An example apparatus includes a communications filter to analyze a network communication originating from within a secured portion of a network and to be transmitted to a destination outside of the secured portion of the network, a communications parser to identify a first service, an address associated with the first service within the secured portion of the network, and to identify a subset of ports used by the first service, and a firewall exception generator to store an identifier of the first service, the address, and the subset of the ports when the network communication includes the identifier, the address, and the subset of the ports.

In some examples, the communications filter compares a second network communication, received from outside of the secured portion of the network, to the identifier of the first service, the address, and the subset of the ports. In some such examples, the communications filter forwards the second network communication to an address and a port specified by the second network communication when the second network communication matches the identifier of the first service, the address, and a port in the subset of the ports.

In some examples, the communications filter forwards the second network communication to an address and a port specified by the second network communication when the second network communication matches the address and a port in the subset of the ports and does not match the identifier, based on at least one of a threshold time for the first network communication or a ping flag. In some example apparatus, the communications parser identifies a value for the ping flag based on the first network communication, and the firewall exception generator is to store the value of the ping flag based on the first network communication.

In some examples, at least one of the first or second network communications comprises a distributed component object model communication. Some example apparatus further include a storage device, the firewall exception generator to store the identifier, the address, and the subset of ports in the storage device.

An example computer readable storage medium comprises computer readable instructions which, when executed by a processor, cause the processor to analyze a network communication to identify a first service, an address associated with the first service within a secured portion of a network, and a subset of ports used by the first service, the network communication originating from within the secured portion of the network and to be transmitted to a destination outside of the secured portion of the network, and store an identifier of the first service, the address, and the subset of the ports when the network communication includes the identifier, the address, and the subset of the ports.

DETAILED DESCRIPTION

Figure 1:
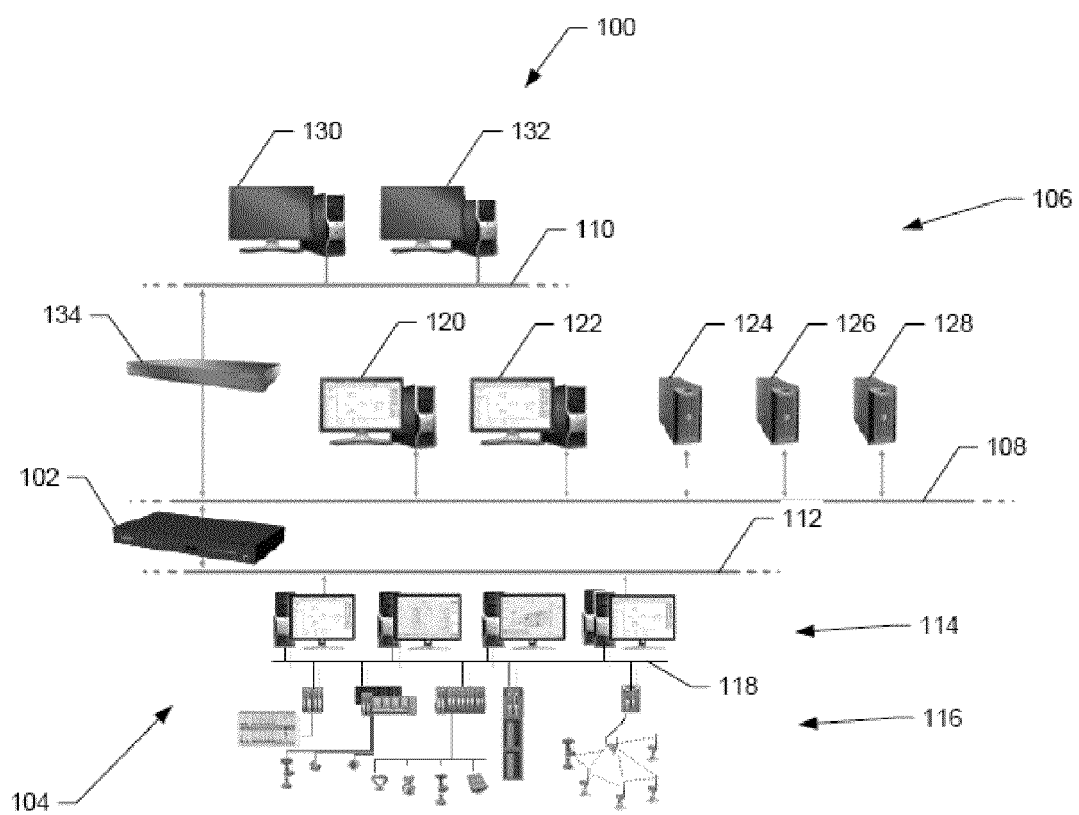
FIG. 1 depicts a process control environment including an example firewall.

Although the following describes example methods, apparatus, and articles of manufacture including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods, apparatus, and articles of manufacture, persons of ordinary skill in the art will readily appreciate that the examples provided are not the only way to implement such methods, apparatus, and articles of manufacture.

Firewalls are commonly used to provide security to communication networks and, in general, may be used to prevent unauthorized access to a communication network by communications originating in another network and/or device. Typically, a firewall is physically or logically located at a point connecting the network to be protected or having a relatively high security level to another network having a relatively lower security level. Some systems or networks involve multiple levels of security and, thus, may include multiple firewalls and/or other security provisions. Typically, in these more complex systems or networks, the multiple levels of security may be considered different layers or zones of increasing security. As the security increases for each successive layer, zone or level, the restrictions associated with what entities may communicate with the next higher security layer, zone or level increase and, accordingly, the number of entities authorized to communicate typically decreases.

General purpose firewalls, which are commonly used in enterprise information technology (IT) networks, are very complex devices and require significant IT experience to install, configure and maintain properly. For example, such general purpose firewalls use communication rules as a security mechanism to determine which communications are unauthorized and, thus, are to be blocked. More specifically, each communication packet attempting to traverse the firewall (i.e., attempting to pass from the lower security level on one side of the firewall to the higher security side protected by the firewall) is interrogated and evaluated in view of the rules established within the firewall. Any packet failing to satisfy the rules for communication packets permitted to pass through the firewall are rejected and blocked.

The rules used by these general purpose firewalls are empirically developed for each application, computer or other device that is to access applications, computers and/or devices on the secure side of the firewall. Such rule development, which may be considered a part of the firewall configuration process, may be carried out by highly skilled IT personnel and/or others having significant experience with networking and data analysis. The rule development process often involves monitoring communications traffic in an unrestricted operational mode to determine the characteristics of each authorized communication and then creating appropriate rules for use by the firewall that result in allowing only these authorized communications to pass through the firewall. More generally, the rule development process seeks to fingerprint or develop a signature, encapsulated in a rule, for each authorized type of communication and to use these fingerprints or signatures to interrogate and block unauthorized communications.

While the foregoing rule development process provides substantial flexibility that enables general purpose firewalls to be applied in virtually any type of network, system or application, a considerable amount of skill is needed to ensure that the firewall is not improperly configured (e.g., that the rules are properly developed). Improper configuration of the firewall can, in some cases, lead to unauthorized access to the network to be protected by the firewall and/or blocking of authorized communications. Furthermore, the flexibility or versatility offered by general purpose firewalls is not needed in more targeted applications where a special purpose firewall may be used.

In the case of process control systems, using a general purpose firewall to provide security between, for example, a process control system network and more general purpose networks within a plant or enterprise associated with the process control system introduces the difficulties noted above in connection with general purpose firewalls. However, these difficulties are further compounded in a process control environment because these general purpose firewalls are often maintained by IT or other personnel outside (e.g., remote from) the process area(s) and, thus, may not be available as needed to maintain the time-critical processes of the process control system.

Accordingly, example methods, apparatus, and articles of manufacture described herein provide a special purpose firewall for use in process control systems or environments. More specifically, example firewalls described herein eliminate the need to develop rules to configure the firewalls in the manner noted above in connection with general purpose firewalls.

Instead, the firewalls contain (e.g., in a memory) a list of applications including information used to establish communication connections between the applications and devices that are typically distributed throughout a process control system or plant. The information contained within the applications of the list may include information characterizing the communications for each authorized type of communication (e.g., rules) among other data.

In some examples, the configuration process may involve a graphical user interface to present a graphic and/or textual list (e.g., a drop-down list) of the available applications, each of which may correspond to a particular communication connection between applications, computers and/or devices on opposite sides of the firewall. To configure the firewall, a user may simply select (e.g., with a mouse or other pointing device) one or more of the applications and the firewall, in response, instantiates the rules associated with the selected application(s). The graphical user interface may provide various selections associated with different types of connections such as outbound and inbound connections, intrusion prevention and scan protection. Still further, for each selection application, the graphical user interface may enable the user to specify that communications associated with the selected application are to be logged and/or that the selected applications (and its rules) are to expire after a specified amount of time (i.e., a temporary authorized connection).

The list of applications may be pre-populated in the firewall (e.g., at the time of manufacture) or may be later downloaded to the firewall via, for example, the secure communication network to which the firewall is connected, via a configuration station, via a handheld device, etc. Additionally, example firewalls described herein enable users to create applications to add to the list of applications. Such additional applications may be added by developing rules as set forth above in connection with general purpose firewalls and then loading the rules in the firewall to enable the firewall to present these added applications together with the pre-populated applications by way of the graphical user interface.

Example firewalls described herein also process distributed component object model (DCOM) communications without having to open and expose unused ports in the firewall. In general purpose firewalls, DCOM communications may be handled in a conventional manner that leaves open a number of ports in the firewall to facilitate a dynamic (rather than permanent) port assignment process, which is part of establishing a conventional DCOM connection. In other words, the general purpose firewall may include rules for handling DCOM communications that dynamically assign ports that have been left open in the firewall for that purpose. However, leaving open a number of ports for this purpose exposes those ports to potentially be used to gain unauthorized access through the firewall.

In contrast to the known technique for processing DCOM communications in a firewall as noted above, example firewalls described herein automatically detect when a DCOM communication is being established through the firewall and dynamically opens a predetermined port and then closes the port when the communication is terminated. In this manner, multiple ports are not left open in the firewall for later dynamic assignment as is done with the above-noted known technique. As a result, the example firewalls described herein provide a substantially more secure system.

Now turning to FIG. 1, a process control environment 100 includes an example firewall 102 described herein. The example firewall 102 interposes communications between a process area or level 104 and a plant or enterprise level 106 of the process control environment 100. More specifically, the example firewall 102 blocks unauthorized communications conveyed via relatively lower security networks 108 and 110 to the firewall 102 and destined for a relatively higher security network 112 associated with the process level 104. The lower security networks may 108 and 110 correspond to a corporate network 110 at a lowest security level, a plant network 108 at a next highest security level and a process control network 112 at the highest security level.

The process level 104 may include one or more workstations or application stations 114 that are communicatively coupled to controllers, input/output devices, and field devices 116 via a local area network 118 dedicated to these devices. The plant or enterprise level 106 includes one or more controlled access workstations 120 and 122 and one or more servers 124, 126 and 128, which may perform various data services (e.g., historian services, anti-virus services, software patching services, etc.). The plant or enterprise level 106 may also include enterprise level workstations 130 and 132, which may perform accounting functions, enterprise integration functions, etc. Additionally, a general purpose firewall 134 may interpose communications between the enterprise level workstations 130 and 132 and the network associated with the controlled access workstations 120 and 122 and the servers 124, 126 and 128.

Thus, the example process control environment 100 of FIG. 1 includes three levels of security, where the lowest level of security corresponds to the enterprise level workstations 130 and 132, the next highest level of security correspond to the controlled access workstations 120 and 122 and the servers 124, 126 and 128, and the highest level of security corresponds to the process area 104. In accordance with the teachings of this disclosure, the example firewall 102 provides the functionality noted above and described in greater detail below in connection with FIGS. 2-8. Additionally, while the example firewall 102 is described in connection with the process control environment 100 of FIG. 1, the example firewall 102 may be more generally applied to any other existing or later developed process control environment.

Figure 2:
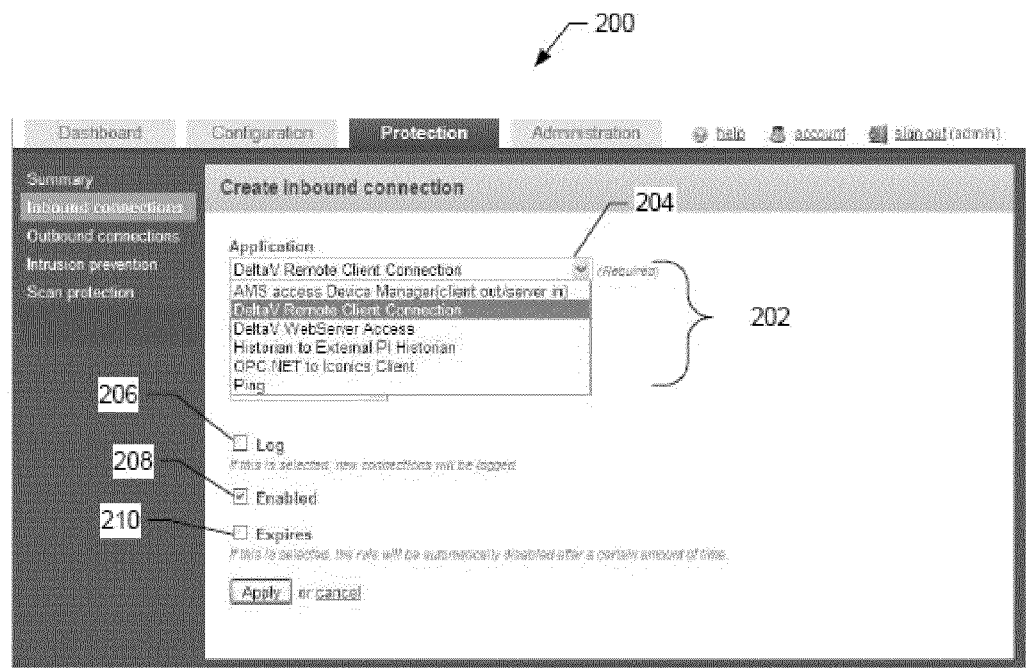
FIG. 2 depicts an example graphical user interface that may be used to configure the example firewall of FIG. 1.

FIG. 2 depicts an example graphical user interface 200 that may be used to configure the example firewall 102 of FIG. 1. More specifically, the example graphical user interface 200 may be generated by executing instructions, code or software stored in a memory (not shown) of the firewall 102 via a processing unit or processor of the firewall 102. In one example, a computer (e.g., a laptop, a handheld device, etc.) may be coupled (e.g., via a hardwired connection, wirelessly, etc.) to the firewall 102 to enable a user to view the example graphical user interface 200. Alternatively or additionally, the user may be able to invoke and view the user interface 200 via one or more of the computing devices shown in FIG. 1 such as the workstations 120, 122, 130 and/or 132 and/or the application stations 114.

In any event, the example graphical user interface 200 enables a user to select one or more applications 202 via a pull-down list or menu 204. Each of the available applications 202 corresponds to an authorized communication connection and an underlying rule or set of rules to be used by the firewall 102 to permit the respective authorized communications to traverse the firewall 102. The applications 202 may be pre-populated or stored in the firewall 102 at the time of manufacture of the firewall 102 or at any other time prior to configuration of the firewall 102. Further, one or more of the applications 202 in the pull-down list 204 may be added by a user after developing the rules using known techniques.

The example graphical user interface 200 also includes a log checkbox 206, which may be selected by a user to cause any selected connections or applications 202 to be logged.

Additionally, the graphical user interface 200 may include an enable checkbox 208 that may be user selected to enable selected applications, and an "Expires" checkbox 210, which may be selected to cause one or more of the selected applications (e.g., rules) 202 to become disabled after a predetermined (e.g., user specified) amount of time.

Figure 3:
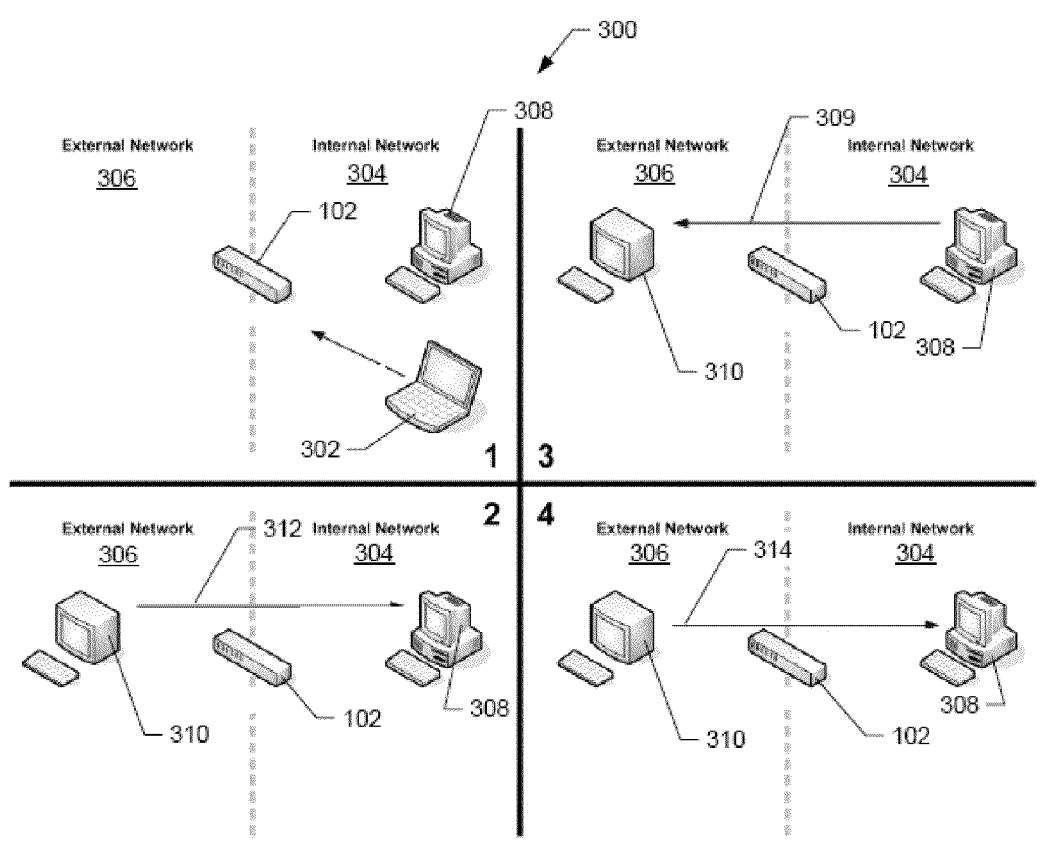
FIGS. 3 and 4 depict a diagrammatic view and a flowchart, respectively, of an example manner or process by which DCOM communications may be processed by the example firewall of FIG. 1.
Figure 4:
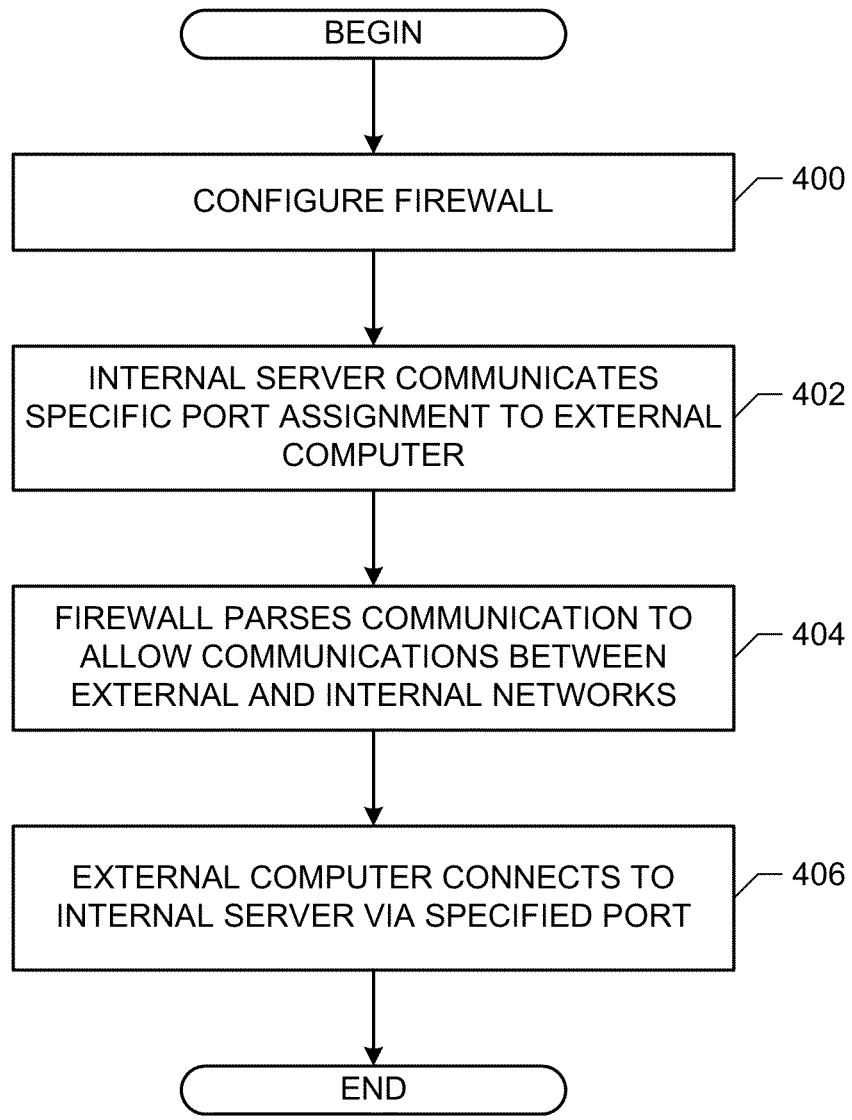

FIG. 3 depicts a diagrammatic view 300 and FIG. 4 is a flowchart depicting an example manner or process by which DCOM communications may be processed by the example firewall 102 of FIG. 1. Referring to both FIGS. 3 and 4, initially a network administrator 302 is communicatively coupled to the firewall 102 (FIG. 1) to configure the firewall 102 to allow access to an internal or high security network 304, or a secured portion of a network, from a relatively lower security external network 306, or the outside of a secured portion of a network, via a specific port of the firewall 102 (block 400).

A server 308 connected to the high security, internal network 304 sends a communication 309 through the firewall 102 to an external computer 310 connected to the external, lower security network 306 (block 402). This communication 309 contains information for the external computer 310 to instruct the computer 310 to use the port specified at block 400 for communications with the internal network 304 and, specifically, the server 308. Additionally, the firewall 102 parses this communication 309 and, based on the information extracted from the parsed communication 309, causes the firewall 102 to temporarily allow communications between the external network 306 and the internal network 304 via the temporary connection on the specified port (block 404). More specifically, the parsing of the communication 309 at block 404 may involve an automatic determination that the requested communication is a DCOM communication.

The external computer 310 then connects to the server 308 via the specified port and requests 312 a connection to a DCOM service within the server 308 (block 406). The firewall 102 allows the connection and, thus, the external computer 310 and the server 308 can exchange DCOM communications 314 through the firewall 102 (block 406).

The example of FIGS. 3 and 4 merely represents one manner in which the example firewall 102 may be used to establish DCOM communications between a protected or higher security network and a relatively lower security network without having to open or expose a plurality of ports of the firewall 102. As a result, the example firewall 102 may provide a substantially higher level of network security than the aforementioned known general purpose firewalls. More detailed examples to secure a network using the firewall 102 are described below.

Figure 5:
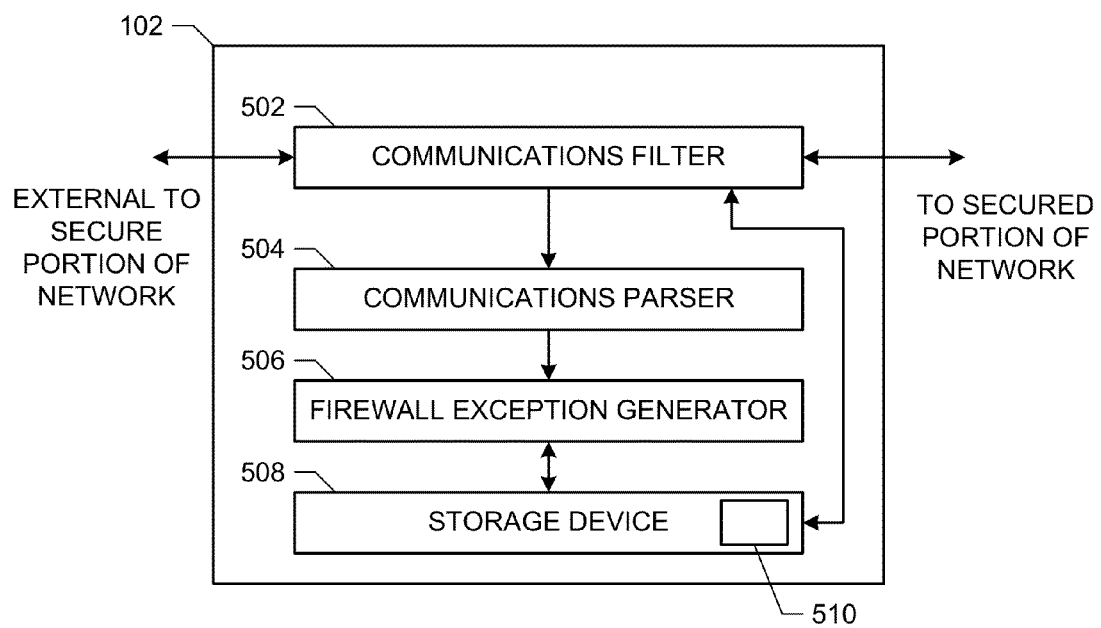
FIG. 5 is a more detailed block diagram of the example firewall of FIG. 1.

FIG. 5 is a more detailed block diagram of the example firewall 102 of FIG. 1. The example firewall 102 of FIG. 5 may be used to, for example, secure a portion of a network (e.g., the higher-security network 112) relative to another portion of a network (e.g., the lower-security networks 108, 110).

The example firewall 102 of FIG. 5 includes a communications filter 502, a communications parser 504, a firewall exception generator 506, and a storage device 508.

The example communications filter 502 of FIG. 5 receives communications from a secured portion of the network (e.g., application stations 114, field devices 116, etc.) to be transmitted to destinations external to the secured portion of the network. The example communications filter 502 also receives communications from devices external to the secured portion of the network to be transmitted to destinations within the secured portion of the network. In some examples, the communications traversing the firewall 102 include DCOM communications and/or communications associated with services and/or remote procedure calls.

To secure the secured portion of the network, the example communications filter 502 analyzes network communications between the secured portion and resources external to the secured portion to determine whether such communications are desired. In some examples, the firewall 102 dynamically authorizes communications (e.g., DCOM communications) to be transmitted to the secured portion of the network from resources external to the secured portion to enable desired services to operate without unnecessarily exposing the secured network to attacks on unused communications ports.

To dynamically authorize communications, the example communications filter 502 analyzes a network communication originating from within a secured portion of a network and to be transmitted to a destination outside of the secured portion of the network (e.g., the communication 309 of FIG. 3). The example communications parser 504 parses the communication to identify a service associated with the communication (e.g., an interface universal identifier of a DCOM service), identify an address of a device within the secure network based on the communication (e.g., an IP address to which dynamically authorized communication(s) received from outside the secured portion of the network are to be transmitted), and a subset of ports to be opened for the dynamically authorized communication(s).

The example communications parser 504 may expediently recognize the presence of such information in the parsed network communication by identifying a marker in the payload of communication (e.g., a marker string). If the marker is not present, the communications parser 504 may stop searching the communication. On the other hand, if the marker is present, the example firewall exception generator 506 extracts the service identifier (e.g., the UID), the address, and the port(s) from the network communication. The example firewall exception generator 506 stores the service identifier, the address, and the port(s) as an exception in an exception list 510 stored in the storage device 508. In some examples, the firewall exception generator 506 determines whether a ping flag or variable has a first value (e.g., enabled, disabled). The ping flag may be used to enable further services to be authorized based on the network communication (e.g., for services related to a dynamically authorized service).

While the exception remains authorized, the example firewall 102 receives one or more network communications from outside of the secured portion of the network destined for the secure portion of the network (e.g., the communications 312, 314 of FIG. 3). The example communications filter 502 compares the network communication to the service identifier(s), the address(es), and the port(s) in the entries in the exception list 510 (e.g., in the storage 508) to identify a match. If a match exists, the example communications filter 502 forwards the communication.

If the communications filter 502 determines that the communication matches an exception on the address and the port(s), but does not match the service identifier, the example communications filter 502 determines whether a master connection is still active (e.g., whether the communication 309 has timed out or disconnected). If the master connection is active, the example communications filter 502 may forward the communication to the device. On the other hand, if the master connection is inactive, the example communications filter 502 may determine whether the ping flag is enabled. If the ping flag is disabled, the example communications filter 502 may forward the communication to the device. However, if the master connection is inactive and the ping flag is enabled, the communications filter 502 filters or discards the communication.

Example components and functions of the example firewall 102 of FIG. 5 are described above. The example firewall 102 may additionally perform other firewall functions, such as standard firewall functionality. These functions are not discussed to avoid obscuring the examples. Furthermore, while the example firewalls 102 of FIGS. 1-5 are described as a separate firewall, the example firewalls 102 may be implemented as software firewalls on a computing device in a network to protect the computing device.

While an example manner of implementing the firewall 102 of FIG. 1 has been illustrated in FIG. 5, one or more of the elements, processes and/or devices illustrated in FIG. 5 may be combined, divided, re-arranged, omitted, eliminated and/or implemented in any other way. Further, the example communications filter 502, the example communications parser 504, the example firewall exception generator 506, the example storage device 508 and/or, more generally, the example firewall 102 of FIGS. 1 and/or 5 may be implemented by hardware, software, firmware and/or any combination of hardware, software and/or firmware. Thus, for example, any of the example communications filter 502, the example communications parser 504, the example firewall exception generator 506, the example storage device 508 and/or, more generally, the example firewall 102 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example communications filter 502, the example communications parser 504, the example firewall exception generator 506, and/or the example storage device 508 are hereby expressly defined to include a tangible computer readable medium such as a memory, DVD, CD, Blu-ray, etc. storing the software and/or firmware. Further still, the example firewall 102 of FIGS. 1 and/or 5 may include one or more elements, processes and/or devices in addition to, or instead of, those illustrated in FIG. 5, and/or may include more than one of any or all of the illustrated elements, processes and devices.

Flowcharts representative of example methods for implementing the firewall 102 of FIGS. 1 and/or 5 are shown in FIGS. 4 and 6-8. In these examples, the methods may be implemented using machine readable instructions that comprise program(s) for execution by a processor such as the processor 912 shown in the example processing platform 900 discussed below in connection with FIG. 9. The program(s) may be embodied in software stored on a tangible computer readable medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program(s) are described with reference to the flowchart illustrated in FIGS. 4 and 6-8, many other methods of implementing the example firewall 102 may alternatively be used. For example, the orders of execution of the blocks may be changed, and/or some of the blocks described may be changed, eliminated, or combined.

As mentioned above, the example processes of FIGS. 4 and 6-8 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4 and 6-8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 6:
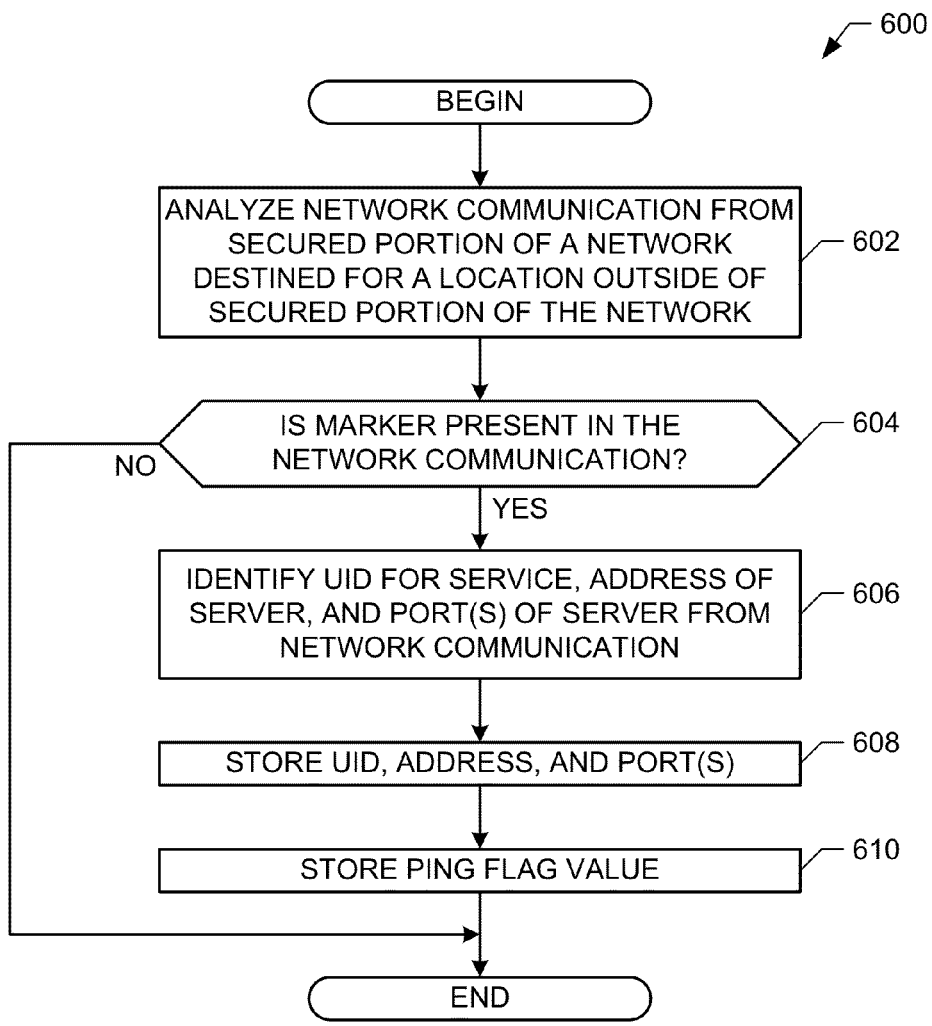
FIG. 6 is a flowchart representative of an example method to implement the firewall of FIGS. 1 and 5 to dynamically create an exception for a service.

FIG. 6 is a flowchart representative of an example method 600 to implement the firewall 102 of FIGS. 1 and 5 to dynamically create an exception for a service. The example method 600 may be performed when the firewall 102 receives a network communication from a device within a secured portion of a network (e.g., the network 112 of FIG. 1) destined for a device external to the secured portion of the network.

The example method 600 begins by analyzing (e.g., via the communications filter 502 of FIG. 5) the network communication from the secured portion of the network destined for a location or device outside the secured portion of the network (block 602). The example communications parser 504 determines whether a marker is present in the network communication (block 604). If the marker is present (block 604), the example firewall exception generator 506 identifies a UID for a service, an address (e.g., an IP address of the server 308 of FIG. 3), and port(s) of the server 308 from the network communication (block 606). The example firewall exception generator 506 stores the UID, the address, and the port(s) (e.g., in the exception list 510 in the storage device 508 of FIG. 5) (block 608). In the example of FIG. 6, the firewall exception generator 506 also stores a ping flag value (block 610). The example method 600 then ends.

Figure 7:
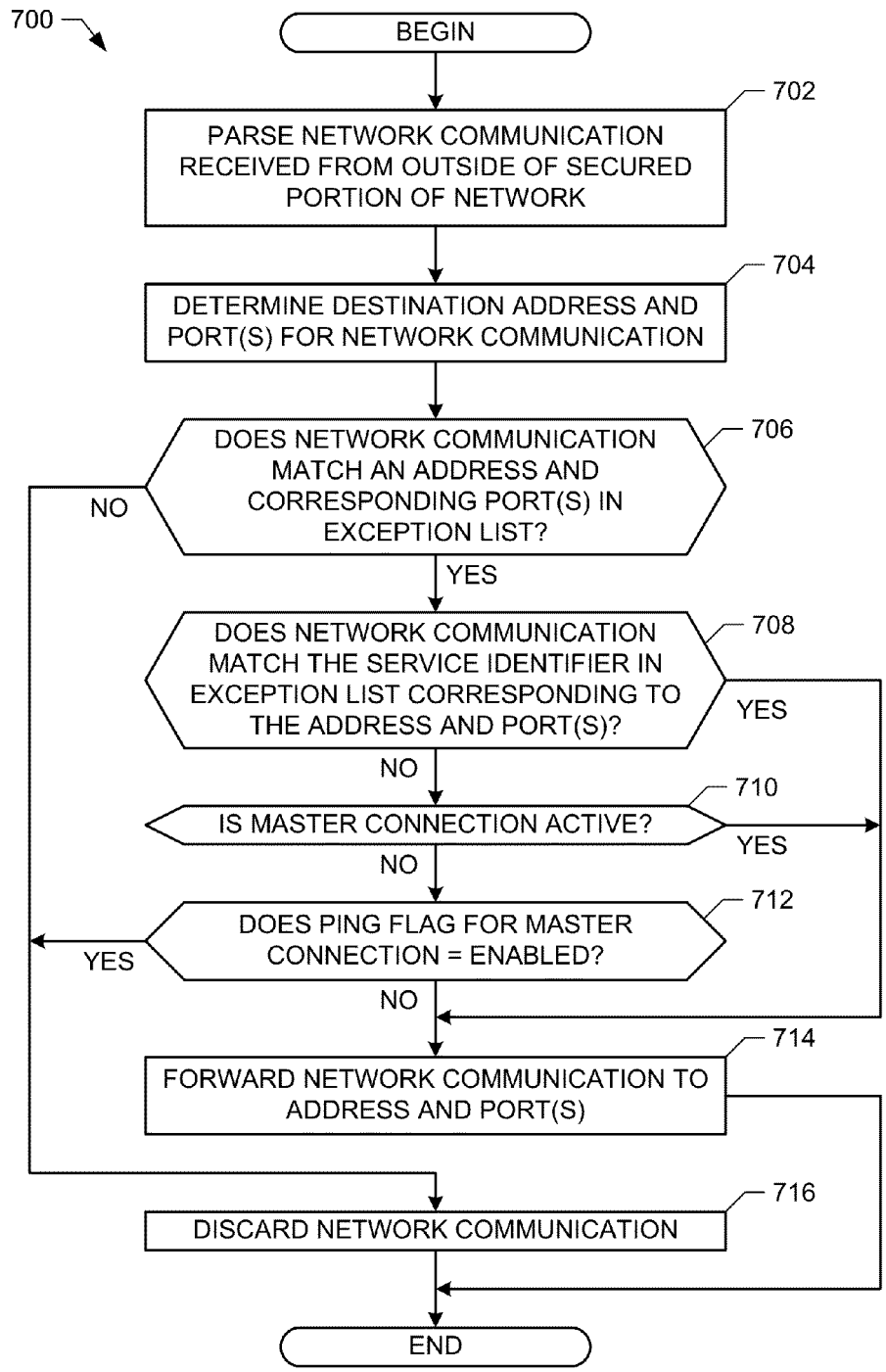
FIG. 7 is a flowchart representative of an example method to implement the firewall of FIGS. 1 and 5 to selectively permit communications for a service to be passed to a secured portion of a network.

FIG. 7 is a flowchart representative of an example method 700 to implement the firewall 102 of FIGS. 1 and 5 to selectively permit communications for a service to be passed to a secured portion of a network. The example method 700 may be performed by the example firewall 102 when, for example, a communication is received for transmission to the secured portion of a network (e.g., the communications 312, 314 of FIG. 3).

The example method 700 begins by analyzing (e.g., via the communications filter 502 of FIG. 5) a network communication received from outside of a secured portion of a network (block 702). The example communications filter 502 determines a destination address and port(s) for the network communication (block 704).

The example communications filter 502 determines whether the network communication matches an address and port(s) corresponding to the address in an exception list (e.g., the exception list 510 of FIG. 5) (block 706). If the network communication does not match any addresses and corresponding port(s) in the exception list 510 (block 706), the example communications filter 502 discards the network communication (block 716).

On the other hand, if the communications filter 502 determines that the network communication does match an address and corresponding port(s), the example communications filter 502 determines whether the network communication matches the service identifier (e.g., the UID) in the exception list 510 that corresponds to the matched address and port(s) (block 708). If the network communication matches the service identifier (block 708), the example communications filter 502 forwards the network communication to the address and the port(s) within the secured portion of the network (block 714).

If the network communication matches an address and corresponding port(s), but does not match the service identifier (block 708), the example communications filter 502 determines whether a master connection for the network communication is active (block 710). The master communication may be the network communication from which the matching exception in the exception list 510 was derived (e.g., the network communication 309 for the communications 312, 314 of FIG. 3). If the master connection is active (block 710), the example communications filter 502 may forward the network communication (block 714). If the master connection is not active (block 710), the example communications filter 502 determines whether the ping flag for the master connection is enabled (block 712). For example, the communications filter 502 may check the exception list 510 for the entry matching the address and the port(s) to determine a value of the ping flag or variable. If the ping flag for the master connection is enabled (block 712), the example communications filter 502 filters or discards the network communication. On the other hand, if the ping flag is disabled (block 712), the example communications filter 502 forwards the network communication to the address and port(s) in the secured portion of the network (block 714).

After forwarding the network communication (block 714) or discarding the network communication (block 716), the example method 700 may end.

Figure 8:
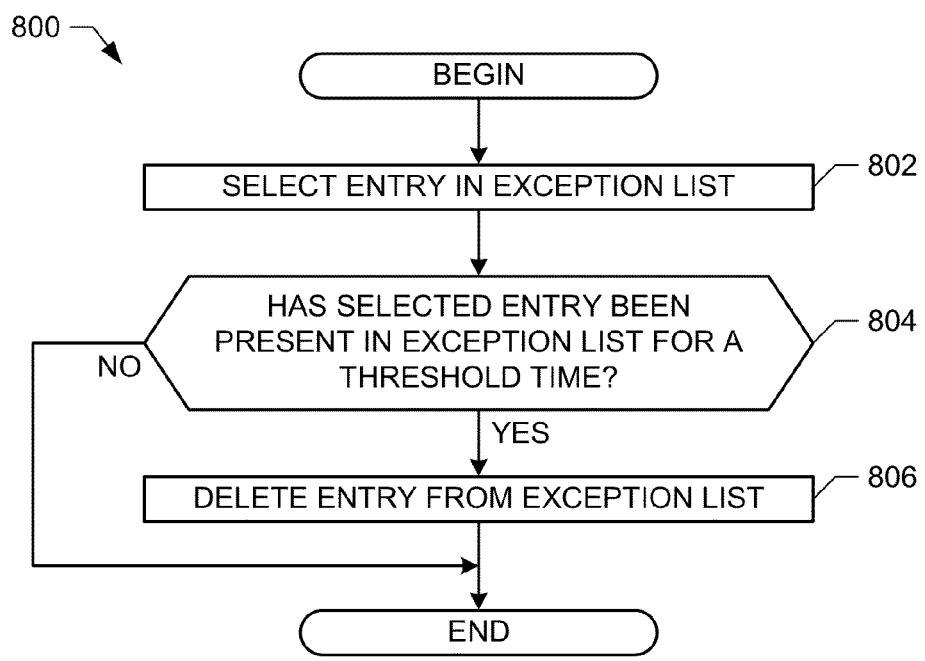
FIG. 8 is a flowchart representative of an example method to implement the firewall of FIGS. 1 and 5 to manage dynamic exceptions for services.

FIG. 8 is a flowchart representative of an example method 800 to implement the firewall 102 of FIGS. 1 and 5 to manage dynamic exceptions for services. The example method 800 of FIG. 8 may be performed periodically, aperiodically, on demand, in response to an event, and/or at any other time to manage dynamic exceptions.

The example firewall exception generator 506 of FIG. 5 selects an entry in the exception list 510 (e.g., in the storage device 508) (block 802). The example firewall exception generator 506 determines whether the selected entry has been present in the exception list 510 for a threshold amount of time (block 804). The threshold time may be empirically determined, set by policy, and/or set by an administrator of the secure portion of the network. If the selected entry has been present in the exception list 510 for the threshold time (block 804), the example firewall exception generator 506 deletes the entry from the exception list (block 806). Deleting the exception entry may increase the security of the secured portion of the network by reducing a number of open but unused ports in the firewall 102. If the selected entry has been present for less than the threshold time (block 804), or after deleting the entry (block 806), the example method 800 may end. In some examples, the firewall exception generator 506 iterates the method 800 for each of the entries in the exception list 510.

Figure 9:
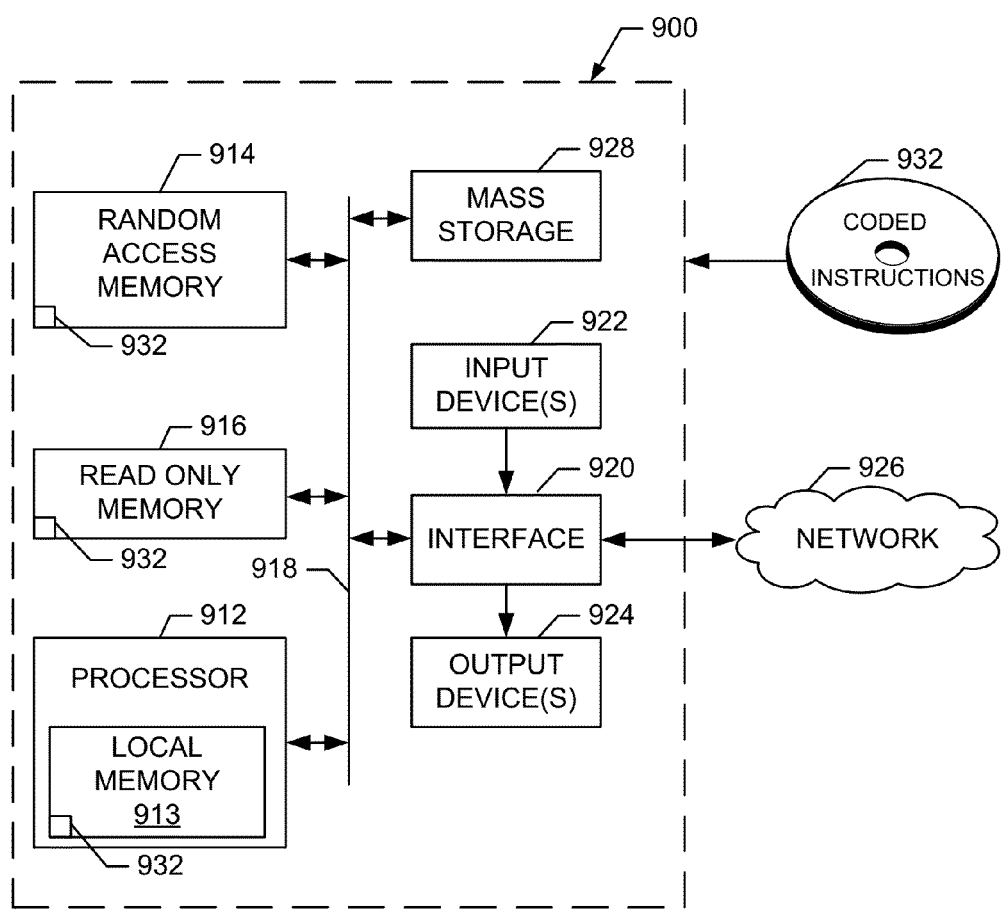
FIG. 9 is a block diagram of an example processing platform capable of executing the instructions of FIGS. 4 and 6-8 to implement the firewall of FIGS. 1 and/or 5

FIG. 9 is a block diagram of an example processing platform 900 capable of executing the instructions of FIGS. 4 and 6-8 to implement the firewall 102 of FIGS. 1 and/or 5. The processing platform 900 can be, for example, a firewall appliance, a server, a personal computer, or any other type of computing device or Internet appliance.

The processing platform 900 of the instant example includes a processor 912. For example, the processor 912 can be implemented by one or more microprocessors or controllers from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processing platform 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a track-pad, a trackball, isopoint and/or a voice recognition system.

One or more output devices 924 are also connected to the interface circuit 920. The output devices 924 can be implemented, for example, by display devices (e.g., a liquid crystal display, a cathode ray tube display (CRT), etc.). The interface circuit 920, thus, typically includes a graphics driver card.

The interface circuit 920 also includes a communication device such as a modem or network interface card to facilitate exchange of data with external computers via a network 926 (e.g., an Ethernet connection, a digital subscriber line (DSL), a telephone line, coaxial cable, a cellular telephone system, etc.).

The processing platform 900 also includes one or more mass storage devices 928 for storing software and data. Examples of such mass storage devices 928 include floppy disk drives, hard drive disks, compact disk drives and digital versatile disk (DVD) drives. The mass storage device 928 may implement the example storage device 508 of FIG. 5.

Coded instructions 932 to implement the methods of FIGS. 4 and 6-8 may be stored in the mass storage device 928, in the volatile memory 914, in the non-volatile memory 916, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
   analyzing, using a logic circuit, a first network communication to identify a service, an address associated with the service, and a port used by the service, the port to be opened to allow communication between a first portion and a second portion of a network, the first network communication originating in the first portion of the network having a first level of security and to be transmitted to a second portion of the network having a second level of security different from the first level of security;

storing, using the logic circuit, an identifier of the service, the address, and the port as an entry in an exception list for use by a firewall, the exception list indicating the ports to open to allow communications; and comparing, using the logic circuit, an amount of time the entry was present in the exception list to a threshold time; and removing, using the logic circuit, the entry from the exception list based on the threshold time when the amount of time the entry was present exceeds the threshold time.

2. The method as defined in claim 1, further comprising comparing a second network communication, received from outside of the first portion of the network, to the identifier of the service, the address, and the port.

3. The method as defined in claim 2, further comprising forwarding the second network communication to an address and a port specified by the second network communication when the second network communication matches the identifier of the service, the address, and the port.

4. The method as defined in claim 2, further comprising forwarding the second network communication to the address and the port specified by the second network communication when the second network communication matches the address and the port and does not match the identifier, based on at least one of the threshold time for the first network communication or a ping flag.

5. The method as defined in claim 4, further comprising setting the ping flag based on the first network communication.

6. The method as defined in claim 2, further comprising discarding the second network communication when the second network communication does not match the address and the port corresponding to the service.

7. An apparatus, comprising:
a communications filter to analyze a first network communication originating from within a first portion of a network and to be transmitted to a second portion of the network;

a communications parser to identify a service, an address associated with the service within the first portion of the network, and a port used by the service, the port to be opened to allow communication between the first and second portions of the network; and a firewall exception generator to
store an identifier of the service, the address, and the port as an entry in an exception list when the first network communication includes the identifier, the address, and the port;

compare an amount of time the entry was present in the exception list to a threshold time; and remove the entry when the amount of time exceeds the threshold time, wherein at least one of the communications filter, the communications parser, or the firewall exception generator is implemented using a logic circuit.

8. The apparatus as defined in claim 7, wherein the communications filter is to compare a second network communication, received from outside of the first portion of the network, to the entry in the exception list.

9. The apparatus as defined in claim 8, wherein the communications filter is to forward the second network communication to an address and a port specified by the second network communication when the second network communication matches the entry in the exception list.

10. The apparatus as defined in claim 8, wherein the communications filter is to forward the second network communication to the address and the port specified by the second network communication when the second network communication matches the address and the port and does not match the identifier, based on at least one of the threshold time for the first network communication or a ping flag.

11. The apparatus as defined in claim 10, wherein the communications parser is to identify a value for the ping flag based on the first network communication, and the firewall exception generator is to store the value of the ping flag based on the first network communication.

12. The apparatus as defined in claim 8, wherein at least one of the first or second network communications comprises a distributed component object model communication.

13. The apparatus as defined in claim 7, further comprising a storage device, the firewall exception generator to store the identifier, the address, and the port in the storage device.

14. A tangible computer readable medium comprising computer readable instructions which, when executed, cause a processor to at least:
analyze a first network communication to identify a service, an address associated with the service within a first portion of a network, and a port used by the service, the port to be opened to allow communication, the first network communication originating from within the first portion of the network and to be transmitted to a second portion of the network;

store an identifier of the service, the address, and the port as an entry in an exception list when the first network communication includes the identifier, the address, and the port, the exception list indicating the ports to open to allow communications;

compare an amount of time the entry was present in the exception list to a threshold time; and remove the entry from the exception list based on a threshold time when the amount of time exceeds the threshold time.

15. The tangible computer readable medium as defined in claim 14, wherein the instructions further cause the processor to compare a second network communication, received from outside of the first portion of the network, to the identifier of the service, the address, and the port.

16. The tangible computer readable medium as defined in claim 15, wherein the instructions further cause the processor to forward the second network communication to an address and a port specified by the second network communication when the second network communication matches the identifier of the service, the address, and the port.

17. The tangible computer readable medium as defined in claim 15, wherein the instructions further cause the processor to forward the second network communication to the address and the port specified by the second network communication when the second network communication matches the address and the port and does not match the identifier, based on at least one of the threshold time for the first network communication or a ping flag.

18. The tangible computer readable medium as defined in claim 15, wherein the instructions further cause the processor to discard the second network communication when the second network communication does not match the address and the port corresponding to the service.

* * * * *